Nov. 15, 1966
W. P. MOORE ET AL
3,285,916
PRODUCTION OF POTASSIUM DICHLOROISOCYANURATE
Filed March 18, 1965
2 Sheets-Sheet 1
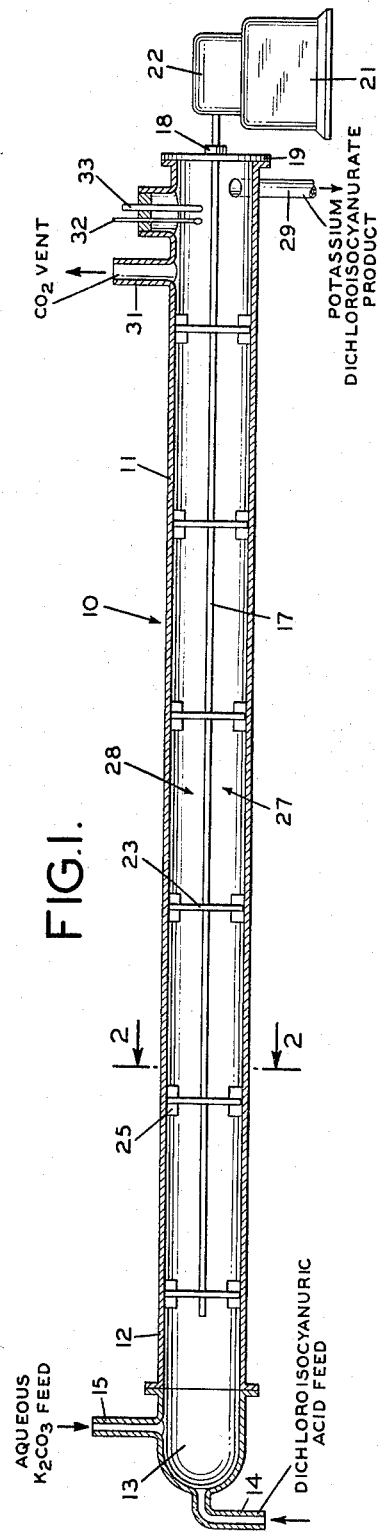
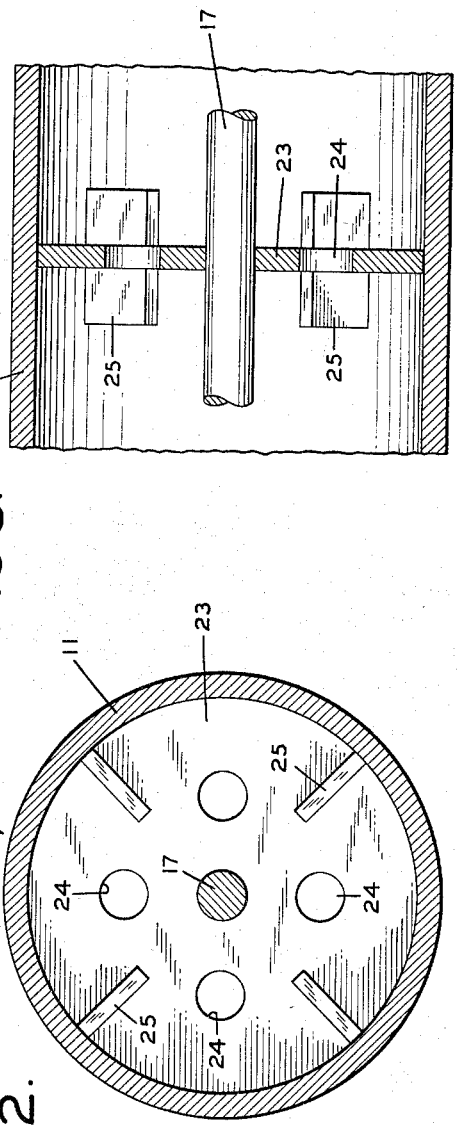
INVENTORS:
WILLIAM P. MOORE
CHARLES B. FITZWILLIAM
BY
Kenneth D. Tremain
ATTORNEY

United States Patent Office 3,285,916
Patented Nov. 15, 1966

---

3,285,916
PRODUCTION OF POTASSIUM DICHLORO-ISOCYANURATE
William P. Moore, Chester, and Charles B. Fitz-William, Richmond, Va., assignors to Allied Chemical Corporation, New York, N.Y., a corporation of New York
Filed Mar. 18, 1965, Ser. No. 440,781
8 Claims. (Cl. 260—248)

This invention relates to the production of potassium dichloroisocyanurate and, more particularly to a continuous process of producing potassium dichloroisocyanurate from dichloroisocyanuric acid.

For the sake of brevity, potassium dichloroisocyanurate will be referred to in this specification as KDIC; dichloroisocyanuric acid as DCIC. In this specification all percentages and parts are given on a weight basis unless otherwise indicated.

KDIC is useful in the production of solid bleach preparations, household and industrial detergent preparations, and for other uses where active chlorine is employed for its bleaching, sterilizing and disinfecting properties.

Procedures for preparing KDIC heretofore suggested have involved neutralization of DCIC with potassium hydroxide, the direct chlorination of tripotassium isocyanurate to produce KDIC; and the reaction of tripotassium isocyanurate with trichloroisocyanuric acid. A batch process of producing sodium dichloroisocyanurate by reacting DCIC with sodium hydroxide is disclosed in U.S. Patent 2,913,460 granted November 17, 1959. The production of KDIC by such batch procedure of reacting potassium hydroxide with DCIC gives low yields of KDIC; the strongly basic potassium hydroxide tends to decompose the reaction product. Moreover, heat evolution is large, limiting the permissible reaction rate and requiring undesirable cooling of the reaction mixture comprising a slurry of the DCIC, which slurry tends to foul the cooling surfaces, making it difficult to obtain the necessary cooling to control the reaction.

Procedures involving the reaction of trichloroisocyanuric acid with tripotassium isocyanurate are commercially objectionable because the trichloroisocyanuric acid is a relatively expensive starting material as compared with DCIC. Moreover, in such reactions considerable heat is generated and under the conditions of the reaction there is a strong tendency for the trichloroisocyanuric acid to decompose to form nitrogen trichloride, thus involving the hazards inherent in the handling of this explosive material. Furthermore, KDIC made in this manner when dry contains relatively large amounts of dust. In this specification, the expression "dust" means the finely divided particles which pass through a 325 mesh (U.S. Standard) screen; KDIC products containing about 30% or more of such material passing through 325 mesh, are considered objectionable because of their high dust content.

The direct chlorination of tripotassium isocyanurate to produce KDIC is disclosed, for example, in Patent 3,035,056 granted May 15, 1962. Such direct chlorination procedures involving the production of potassium chloride as a by-product gives a KDIC product in which the by-product KCl is occluded. The by-product potassium chloride is difficult to wash out of the water-soluble KDIC without incurring high product losses. The presence of even small amounts of potassium chloride markedly reduces the stability of the KDIC product; in other words, KDIC products containing potassium chloride tend to lose their available chlorine in storage and this at a much faster rate than substantially pure KDIC products. Further objections to such direct chlorination procedures are that they require the removal of large amounts of heat to control the reaction and result in KDIC products containing relatively large amounts of dust.

The production of KDIC by reacting DCIC and potassium hydroxide continuously is disclosed, for example, in U.S. Patent 3,035,054 granted May 15, 1962. According to the disclosure of this patent, the reaction of KDIC with potassium hydroxide at a pH above 7.5 results in the formation of decomposition products such as nitrogen trichloride in "highly hazardous amounts." The disclosure of this patent further points out that the addition of aqueous potassium hydroxide to a reaction vessel initially charged with DCIC in admixture with water, or vice versa, without controlling the pH and/or the reaction temperature results in explosive conditions due to the decomposition of the DCIC.

It is a principal object of the present invention to provide a continuous process of producing KDIC which is free of the above-noted objections of prior known procedures and which produces a product containing little or substantially free of dust.

It is another object of this invention to provide such process which can be carried out with high production rates in relatively small equipment.

Other objects and advantages of this invention will be apparent from the following detailed description thereof taken in connection with the accompanying drawings, in which:

FIGURE 1 is a longitudinal section through a preferred form of reactor in which the reaction between the DCIC and the aqueous potassium carbonate solution can be carried out;

FIGURE 2 is a vertical section taken in a plane passing through line 2—2 on FIGURE 1;

FIGURE 3 is a fragmentary section taken in a plane at right angles to the plane of FIGURE 3, through the reactor of FIGURE 2.

Figure 4:
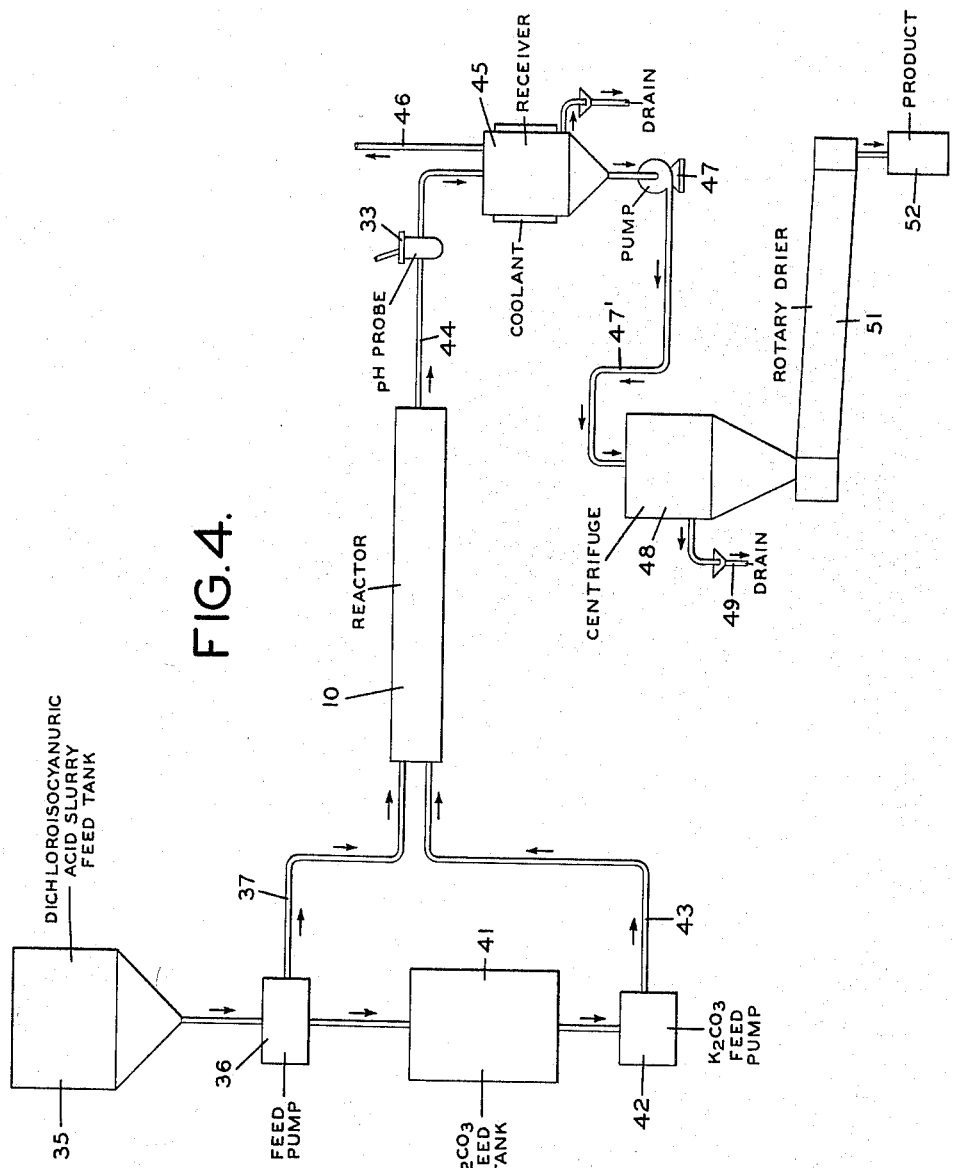
FIGURE 4 is a preferred layout of equipment for practicing the process of this invention.

We have found that the continuous feed of (1) an aqueous slurry of DCIC containing from 20 to 75 weight percent of DCIC and (2) a solution of potassium carbonate containing from 30 to 60 weight percent potassium carbonate introduced in proportions to produce a reaction mixture containing a mol ratio of DCIC to potassium carbonate of from 1.2 to 2.1 through a longitudinally-extending reaction zone extending generally horizontally, which reaction zone has a gas space contiguous to and directly above the lower portion thereof through which the liquid reactants are passed, while agitating the reaction mixture results in the reaction taking place endothermically at high rates to produce good yields of KDIC which is substantially dust-free. The temperature in the reaction zone is maintained within the range of from 5° C. to 75° C., preferably 35° C. to 50° C. This is accomplished either by preheating the reactants to supply the necessary heat for the endothermic reaction or by supplying heat to the reaction zone to maintain the reaction mixture therein within this temperature range.

The reaction is represented by the following equation:

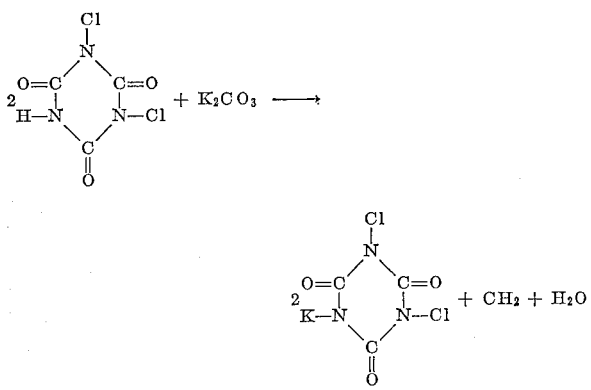

The reactants, DCIC and potassium carbonate can be the commercially available materials, which are added to water to produce respectively the feed slurry of DCIC containing from about 20% to about 75%, preferably from about 30% to about 50% DCIC and the aqueous solution of potassium carbonate containing from about 30% to 60%, preferably from about 40% to about 50% potassium carbonate. The resultant reaction mixture contains from about 25% to about 67.5% solids (DCIC plus $K_2CO_3$) and from about 32.5% to about 75% water.

It is important that the reaction zone be generally horizontally disposed, longitudinally elongated, and arranged for flow of the reaction mixture through the lower 20% to 80%, preferably 50%, of the volume of the reaction zone leaving the remainder upper portion of the volume as a gas space into which can flow the carbon dioxide formed in the reaction. The reaction mixture as it flows through the lower portion of the reaction zone is agitated in a direction substantially at right angles to the direction of flow so as to effect intimate intermingling of the reactants in the reaction mixture without causing substantial back mixing.

The reactor effluent can be continuously pumped from the reactor to a spray dryer, drum dryer or other drying equipment.

Substantially quantitative yields are obtained with residence times within the reactor of from 0.5 to 15 minutes, preferably 1 to 4 minutes. Additional time to effect the drying can be about 1 or 2 minutes or less; spray drying can be effected in 1 or 2 minutes or less. Under optimum conditions the total residence time including the drying time can be as low as 2 minutes.

The utilization of a reaction slurry containing from 20 to 75 weight percent, preferably 30 to 50 weight percent, DCIC and a potassium carbonate solution containing from 30 to 60 weight percent potassium carbonate, preferably 40 to 50 weight percent, thus producing a concentrated reaction mixture, results in a KDIC product which is substantially dust-free. The greater the concentration of the solids (DCIC and potassium carbonate) within the above given ranges, the less dust in the final product, as a general rule.

FIGURE 1 of the drawing shows a preferred form of reactor 10, the main body portion of which consists of a cylinder 11, the longitudinal axis of which is disposed horizontally as shown in FIGURE 1. The axis of cylinder 11 can be horizontal or pitched downwardly somewhat to facilitate forward flow of the reaction mixture therethrough. FIGURE 1 shows the axis horizontal, but it will be appreciated the invention is not limited to this arrangement. At the end 12 of the cylinder 11 a semi-spherical mixing chamber 13 is provided having a DCIC feed inlet 14 and an aqueous potassium carbonate solution feed line 15 leading into the chamber 13. Thus the slurry of DCIC continuously supplied, for example, by means of a suitable pump through inlet 14 and the aqueous potassium carbonate solution continuously supplied, for example, by means of a suitable pump to the inlet 15 mix in chamber 13 and the reaction mixture flows into and through the reaction zone constituted of the mixing chamber 13 and the communicating cylinder 11.

Cylinder 11 has therein a shaft 17 which is disposed along its longitudinal axis and one end of which protrudes through a suitable bearing 18 from end wall 19 of the reactor. Shaft 17 is rotated by a motor 21 which drives shaft 17 through suitable reduction gearing within the housing 22. Shaft 17, it will be understood, is suitably supported in bearings for rotation; the number of such bearings and their disposition are dependent on the length of the shaft. Mounted on the shaft for rotation therewith are spaced agitator discs 23. Each agitator disc 23 has therein spaced openings 24 desirably arranged as shown in FIGURE 2 radially with respect to the shaft 17. In the structure of FIGURE 2, four such openings 24 are provided spaced approximately 90 degrees apart. The openings 24 in each disc are small enough so that the liquid flow through the reaction zone is substantially all in a forward direction. Subsequentially no back mixing occurs. In practice it has been found that the utilization of openings in each disc having a total area of 25% or less of the disc surface area provides for such forward flow of the reaction mixture. Each opening should be large enough to permit the slurry to pass therethrough.

Each disc has fastened thereto an agitating blade 25. Desirably four such blades are employed spaced about 90 degrees apart. Each blade extends from the opposite sides of the disc as clearly shown in FIGURES 1 and 2. When the disc is rotated, the blades 25 moving through the flowing reaction mixture agitate the mixture.

It is important that the discs 23 be spaced relatively close to each other to facilitate the handling of the heavy slurries. The distance between discs should be no more than about three times the diameter of the disc, which diameter is substantially the same as the inside diameter of the reactor.

One design of reactor, of the type shown in FIGURE 1, has an inside diameter of 3.7 cm.; a total length including the effective length of the mixing chamber 13 of about 60 cm.; has 6 discs 23 each of a diameter of 3.6 cm. mounted on shaft 17, spaced 9 cm. apart; and each disc has 4 mixing blades 25 spaced 90 degrees apart, each blade being 0.3 cm. thick, the blades being each .8 cm. wide (the dimension in the radial direction of the disc) and 1.6 cm. long (the dimension in the direction along the length of cylinder 11). Each disc has 4 radial openings 24 spaced 90 degrees apart, as shown in FIGURE 2, each of a diameter of about 0.6 cm. It will be appreciated that these dimensions are given for illustrative purposes and this invention is not limited thereto.

With the reactor disposed in a generally horizontal position, as shown in FIGURE 1, there is provided a lower portion 27 for flow of the liquid reactants therethrough and contiguous thereto an upper gas-receiving portion 28, both of which portions extend for substantially the full length of the reaction zone. The upper gas-receiving portion receives the carbon dioxide liberated as the reaction takes place immediately upon its formation and this aids in promoting complete reaction. The gas space 28 also affords added agitation when the agitator blades 25 break the interfaces between the liquid and gas.

The reactor is operated with from 20% to 80% of its volume, preferably about 50% of its volume, filled with liquid reaction mixture and forming the lower portion 27, and the remainder constituting the upper gas-receiving portion 28. With this design of reactor substantially no back mixing occurs; the reaction mixture flows continuously through the lower portion 27 of the reaction zone, is agitated in a direction substantially at right angle to its direction of flow by the rotating discs 23, and the reaction product mixture is continuously discharged through the exit pipe 29.

At the discharge end of the reactor, a vent 31 is provided through which carbon dioxide collecting in the gas space 28 is continuously vented from the reactor. Desirably the reactor is provided with a thermometer 32 to indicate the temperature therein and a pH probe 33 for indicating the pH conditions at the exit end of the reactor. The pH varies from about 10 at the feed end of the reactor to about 7.5 at the discharge end. No pH control is necessary. By introducing the reactants to provide a reaction mixture in which the mol ratio of DCIC to potassium carbonate is within the range of from 1.2 to 2.1, preferably 1.5 to 1.95, the desired pH conditions are automatically obtained. This mol ratio preferably involves a small excess of potassium carbonate over and above the stoichiometric amount of 2 mols of DCIC per mol of potassium carbonate required for reaction with the DCIC to produce KDIC. Excess potassium carbonate aids in the precipitation of the KDIC product from the reaction mixture. We have found that the excess potassium carbonate, unlike the more strongly alkaline potassium hydroxide, does not result in decomposition of KDIC product.

The reaction mixture discharged through pipe 29 is fed to a dryer of any suitable type, such as a spray dryer or drum dryer to produce the dry KDIC.

FIGURE 4 shows a typical flow sheet for the continuous process of this invention. DCIC is mixed with water in the slurry feed tank 35 to produce a DCIC slurry containing from 20% to 75% of DCIC. This slurry is pumped continuously by feed pump 36 through line 37 to the inlet end of reactor 10 which is of the type described in connection with FIGURE 1. An aqueous potassium carbonate solution having a concentration of 30% to 60% salt is stored in feed tank 41. This aqueous potassium carbonate solution is pumped continuously by pump 42 through line 43 into the inlet end of reactor 10. The reaction takes place in reactor 10 at a temperature of from 5° C. to 75° C. and desirably under atmospheric pressure conditions although superatmospheric conditions can be employed, say up to a pressure of about 30 p.s.i.g. Reaction mixture is continuously withdrawn through line 44 passes through pH probe 33 into a receiver 45, where the product can be cooled when the reaction is carried out at temperatures above about 20° C. The pH probe provides a convenient instrument for determining whether the reaction is proceeding smoothly. When the probe 33 shows a pH of from about 7 to 7.5 this is indicative that the reaction has gone to completion. pH's above 7.5 indicate that the $K_2CO_3$ has not reacted adequately and below 7.0 or 7.1 indicate that the DCIC has not reacted adequately. Corrective measures can be taken by increasing the concentration of the necessary reactant, or the rate of agitation or elevating the temperature to control the reaction to obtain a reaction mixture in which the DCIC is completely reacted and having the desired pH of about 7.5.

During the course of the endothermic reaction the carbon dioxide formed in the reaction rises into the gas space 28 in reactor 10. This carbon dioxide in the arrangement of equipment shown in FIGURE 4 is vented continuously into receiver 45. From this receiver the carbon dioxide is vented through line 46.

Pump 47 pumps KDIC slurry from receiver 45 through line 47' into a centrifuge 48 where liquid is separated from the KDIC. This liquid is discharged through drain 49. Pump 47 can pump the slurry into a spray dryer where the drying can be effected by spraying the slurry downwardly countercurrent to ascending hot gases. Drying can be effected with residence times of 2 minutes or less by introducing the slurry at reaction temperature into a conventional spray dryer.

The centrifuged cake from the base of the centrifuge 48 is fed to a rotary dryer 51 where dry KDIC is produced and discharged to product container 52.

The following examples are given to illustrate preferred embodiments of this invention without however limiting this invention to these examples.

Example 1

In this example the aqueous DCIC slurry fed continuously to the reactor contained 30% DCIC and 70% water. The potassium carbonate solution continuously supplied to the reactor contained 40% potassium carbonate and 60% water. The reactor was of the type shown in FIGURE 1 and consisted of a glass cylinder positioned horizontally, 57.7 cm. long, having an inside diameter of 3.7 cm. with a titanium shaft positioned axially of the reactor rotated at 600 r.p.m. by an external drive. 6 agitator discs were positioned on the axial shaft with the first disc spaced 4.5 cm. from the feed inlets and the succeeding discs spaced 9 cm. apart. The agitator discs were made of polyvinyl chloride, and dimensioned as hereinabove disclosed. The reactor was run during the conduct of this example so that it was about 50% liquid full leaving the remaining upper 50% as a gas space through which flowed the carbon dioxide formed in the reactions.

After steady state conditions had been reached in the reactor a 1 hour run was carried out with the aqueous DCIC slurry at 46° C. fed continuously at a rate of 12,743 grams per hour. The density of this DCIC slurry was 1.13 grams per ml. The potassium carbonate solution at 46° C. was fed continuously at a rate of 3000 ml. per hour or 4162 grams per hour; the density of the potassium carbonate solution was 1.39 grams per ml. The feed of the DCIC slurry and of the potassium carbonate solution were controlled to give a mol ratio of DCIC to potassium carbonate of from 1.60 to 1.62 throughout the 1-hour duration of the example.

As the reaction mixture flowed through the reactor reaction of the DCIC with the potassium carbonate took place with evolution of carbon dioxide which escaped into the gas space occupying about the upper half of the volume of the reactor. The temperature of the reaction mixture decreased gradually along the length of the reactor; the reactor discharge temperature was about 40° C.

The carbon dioxide in the upper 50% of the volume of the horizontal reactor flowed to the discharge end of the reactor where it was continuously vented. The blades of the agitator discs in passing from the gas phase to the slurry phase agitated the reaction mixture in the areas of the reactor between successive agitator discs and gave an intimate mixture of the reactants thus facilitating the reaction going to completion. The residence time in the reactor was 1.3 minutes.

The effluent slurry was discharged continuously from the exit end of the reactor at a pH of about 7.1 to a brine-cooled receiver. From this receiver the reaction mixture at a temperature of about 4° C. was continuously pumped to a perforated-bowl centrifuge. 5239 grams of centrifuge cake was recovered from the centrifuge; centrifuge was discharged to the drain. The centrifuge cake was fed continuously to a countercurrent rotary dryer constructed of titanium and heated by hot air introduced at a temperature of 145° C. and exiting at 75° C. 4229 grams of dry KDIC was recovered. A yield of 93% based on the DCIC feed was obtained. The dry product, analyzed as follows:

|  | Percent |
|---|---|
| Available chlorine | 59.2 |
| pH (1% aqueous solution) | 6.7 |
| Moisture wt. percent | 0.1 |

*Screen analysis, cumulative wt. percent on U.S. Standard screens*

Mesh:
- 20 — 30.2
- 60 — 45.2
- 80 — 50.1
- 100 — 52.5
- 200 — 59.6
- 325 — 73.1

*Example II*

This example was carried out in the same reactor following substantially the same operating procedure of Example I, except that the product from the reactor was supplied continuously to a spray dryer. The DCIC slurry continuously fed to the reactor in Example II contained 20% DCIC and 80% water. The potassium carbonate solution contained 25% potassium carbonate and 75% water. After steady state conditions had been reached in the reactor a 1 hour run was carried out supplying continuously 14,330 grams per hour of the DCIC slurry having a density of 1.10 grams per ml. at a temperature of 44° C. Potassium carbonate solution, also at 44° C., was fed continuously at a rate of 3970 grams per hour; this potassium carbonate solution had a density of 1.23 grams per ml. Mixing of the reactants was rapid as the mixture advanced through the reactor filling approximately the lower half of the reactor with the liquid slurry leaving the upper half as a gas spaced in which the carbon dioxide evolved during the reaction escaped and from which the carbon dioxide was continuously withdrawn at the exit end of the reactor. The temperature of the product discharged from the reactor was 40° C. The feeds of the DCIC slurry and potassium carbonate solution were controlled to give a mol ratio of DCIC to potassium carbonate of about 2.

The spray dryer used was a stainless steel dryer in which combustion gases produced by burning natural gas employing air to support combustion introduced into the spray dryer at a temperature of 390° C. and exiting at a temperature of 145° C. were utilized to effect the drying of the slurry flowing countercurrent to the ascending hot combustion gases. The product was recovered from the conical bottom of the dryer and also from the cyclone separator on the gas discharge line. 2766 grams of dried product was recovered; this represents a yield of 94% based on the DCIC feed.

The dry product analyzed as follows:

|  | Percent |
|---|---|
| Available chlorine | 59.7 |
| pH (1% aqueous solution) | 6.3 |
| Moisture wt. percent | 0.04 |

*Screen size, cumulative wt. percent on U.S. Standard screens*

Mesh:
- 20 — ---
- 60 — ---
- 80 — 6.1
- 100 — 16.1
- 200 — 83.3
- 325 — 95.0

This product it will be noted is substantially dust-free containing only about 5% which passes through 325 mesh.

The materials of construction used for the reactor and associated equipment can be any of the available construction materials resistant to corrosion by the reactants and reaction product. Ceramic, including glass-lined, equipment or titanium-lined construction equipment can be used as well as other construction materials inert to the reactants, reaction product and by-products formed.

It will be noted the present invention provides a continuous process for producing KDIC free of the objections of the prior known procedures and which process produces a product containing little or substantially free of dust. The product being free of potassium chloride which is produced as a by-product in procedures involving the chlorination of tripotassiumisocyanurate is relatively stable, i.e., does not lose active chlorine as rapidly or readily as KDIC produced by such direct chlorination procedures.

It will be further noted that the process of this invention involves relatively short residence times within the reactor. In other words, the reaction rate is rapid under the conditions herein disclosed. Hence the process can be carried out in relatively small synthesis reactors and still obtain large capacities because of the high throughput rates and short residence time feasible under the conditions required for the practice of the process of this invention. Employing a reaction slurry containing a high solids concentration, feasible with the horizontally disposed reactor containing closely spaced agitating discs which enable handling of such slurries, a product is obtained substantially free of dust. Furthermore, control of the reaction as carried out in accordance with this invention does not involve cooling of the reaction mixture with the difficulties entailed in effecting the cooling of the slurry reaction mixture, which slurry tends to foul cooling surfaces. In the process of this invention the reaction is endothermic and the necessary heat required for the reaction is supplied either by introducing the reactants at an elevated temperature, preferably 30° to 60° C., or is supplied by the reactor by heating the latter.

Since certain changes can be made in carrying out the continuous process of producing KDIC herein disclosed, without departing from the scope of this invention, it is intended that all matter contained in the above description or shown in the accompanying drawings, shall be interpreted as illustrative and not in a limiting sense.

We claim:
1. The process of producing potassium dichloroisocyanurate which comprises:
   (a) introducing an aqueous potassium carbonate solution and an aqueous stream of dichloroisocyanuric acid slurry in proportions to produce a reaction mixture having a mol ratio of dichloroisocyanuric acid to potassium carbonate within the range of from 1.2 to 2.1, into a generally horizontally disposed, longitudinally elongated reaction zone having a lower portion for flow of liquid reaction mixture therethrough and having contiguous to said lower portion an upper gas-receiving portion, both of said portions extending for substantially the full length of said reaction zone;
   (b) flowing the resultant mixture through the lower portion of said reaction zone while agitating this mixture, and maintaining it at a temperature within the range of from 5° C. to 75° C.; and
   (c) withdrawing the potassium dichloroisocyanurate containing reaction mixture from the reaction zone.

2. The process of claim 1, in which the mol ratio of dichloroisocyanuric acid to potassium carbonate is within the range of 1.50 to 1.95, and the reaction mixture passed through said reaction zone is maintained at a temperature of from about 35° C. to about 50° C.

3. The process of claim 1, in which the rate of supply of the aqueous stream of dichloroisocyanuric acid and the aqueous solution of potassium carbonate and the rate of withdrawal of the reaction mixture from the reaction zone is such as to maintain the reaction mixture within the reaction zone for a residence time of from 0.5 to 15 minutes.

4. The process of claim 2, in which the rate of supply of the aqueous stream of dichloroisocyanuric acid and the aqueous solution of potassium carbonate and the rate of withdrawal of the reaction mixture from the reaction zone is such as to maintain the reaction mixture within the reaction zone for a residence time of from 1 to 4 minutes.

5. The process of producing potassium dichloroisocyanurate which comprises:
   (a) introducing:
      (1) a stream of an aqueous potassium carbonate solution containing from 30 to 60 weight percent potassium carbonate, and
      (2) an aqueous stream of dichloroisocyanuric acid slurry containing from 20 to 75 weight percent dichloroisocyanuric acid, in proportions to produce a reaction mixture having a mol ratio of dichloroisocyanuric acid to potassium carbonate within the range of from 1.2 to 2.1,
   into one end of a generally horizontally disposed, longitudinally elongated reaction zone having a lower portion for flow of liquid reaction mixture therethrough and having contiguous to said lower portion an upper gas-receiving portion, both of said portions extending for substantially the full length of said reaction zone;
   (b) flowing the resultant mixture through the lower portion of said reaction zone while agitating this mixture, withdrawing the carbon dioxide liberated into the upper gas-receiving portion, and maintaining the mixture at a temperature within the range of from 5° C. to 75° C.;
   (c) venting the carbon dioxide from the gas space; and
   (d) withdrawing the potassium dichloroisocyanurate containing reaction mixture from the opposite end of the reaction zone.

6. The continuous process of producing potassium dichloroisocyanurate which comprises:
   (a) continuously introducing:
      (1) a stream of an aqueous potassium carbonate solution containing from 40 to 50 weight percent potassium carbonate, and
      (2) an aqueous stream of dichloroisocyanuric acid slurry containing from 30 to 50 weight percent dichloroisocyanuric acid, in proportions to produce a reaction mixture having a mol ratio of dichloroisocyanuric acid to potassium carbonate within the range of from 1.50 to 1.95,
   into one end of a generally horizontally disposed, longitudinally elongated reaction zone having a lower portion for flow of liquid reaction mixture therethrough and having contiguous to said lower portion an upper gas-receiving portion, both of said portions extending for substantially the full length of said reaction zone;
   (b) flowing the resultant mixture through the lower portion of said reaction zone while agitating this mixture at substantially right angles to the direction of flow, withdrawing the carbon dioxide liberated into the upper gas-receiving portion, and maintaining the mixture at a temperature within the range of from 35° C. to 50° C.;
   (c) continuously venting the carbon dioxide from the gas space; and
   (d) continuously withdrawing the potassium dichloroisocyanurate containing reaction mixture from the opposite end of the reaction zone.

7. The continuous process of producing potassium dichloroisocyanurate which comprises:
   (a) continuously introducing:
      (1) a stream of an aqueous potassium carbonate solution containing from 30 to 60 weight percent potassium carbonate, and
      (2) an aqueous stream of dichloroisocyanuric acid slurry containing from 20 to 75 weight percent dichloroisocyanuric acid, in proportions to produce a reaction mixture having a mol ratio of dichloroisocyanuric acid to potassium carbonate within the range of from 1.2 to 2.1,
   into one end of a generally horizontally disposed, longitudinally elongated, substantially cylindrical reaction zone, having a lower portion occupying from about 20% to about 80% of the volume of the reactor for flow of liquid reaction mixture therethrough and having an upper gas-receiving portion occupying the remainder of the volume of said reactor;
   (b) flowing the resultant mixture through the lower portion of said reaction zone while agitating this mixture in a direction at right angles to its direction of flow, withdrawing the carbon dioxide liberated into the upper gas-receiving portion, and maintaining the mixture at a temperature within the range of from 5° C. to 75° C., the rate of flow of the reaction mixture through said reaction zone being such as to maintain the reaction mixture in said zone for from 0.5 to 15 minutes;
   (c) continuously venting the carbon dioxide from the gas-receiving portion;
   (d) continuously withdrawing the potassium dichloroisocyanurate containing reaction mixture from the opposite end of the reaction zone; and
   (e) continuously drying the reaction mixture to produce potassium dichloroisocyanurate.

8. The continuous process of producing potassium dichloroisocyanurate which comprises:
   (a) continuously introducing:
      (1) a stream of an aqueous potassium carbonate solution containing from 40 to 50 weight percent potassium carbonate, and
      (2) an aqueous stream of dichloroisocyanuric acid slurry containing from 30 to 50 weight percent dichloroisocyanuric acid, in proportions to produce a reaction mixture having a mol ratio of dichloroisocyanuric acid to potassium carbonate within the range of from 1.50 to 1.95,
   into one end of a generally horizontally disposed, longitudinally elongated, substantially cylindrical reaction zone, having a lower portion occupying about 50% of the volume of the reactor for flow of liquid reaction mixture therethrough and having an upper gas-receiving portion occupying the remainder of the volume of said reactor;
   (b) flowing the resultant mixture through the lower portion of said reaction zone while agitating this mixture in a direction at right angles to its direction of flow, withdrawing the carbon dioxide liberated into the upper gas-receiving portion, and maintaining the mixture at a temperature within the range of from 35° C. to 50° C., the rate of flow of the reaction mixture through said reaction zone being such as to maintain the reaction mixture in said zone for from 1.0 to 4.0 minutes;
   (c) continuously venting the carbon dioxide from the gas-receiving portion;
   (d) continuously withdrawing the potassium dichloroisocyanurate containing reaction mixture from the opposite end of the reaction zone; and
   (e) continuously drying the reaction mixture to produce potassium dichloroisocyanurate.

References Cited by the Examiner
UNITED STATES PATENTS

| | | | |
|---|---|---|---|
| 2,913,460 | 11/1959 | Brown et al. | 260—248 |
| 3,035,054 | 5/1962 | Symes et al. | 260—248 |

WALTER A. MODANCE, *Primary Examiner.*

J. M. FORD, *Assistant Examiner.*